United States Patent
Yoshimura et al.

(10) Patent No.: US 11,901,223 B2
(45) Date of Patent: Feb. 13, 2024

(54) STRESS ANALYSIS METHOD AND SEMICONDUCTOR DEVICE MANUFACTURING METHOD

(71) Applicant: Kioxia Corporation, Minato-ku (JP)

(72) Inventors: Hiroshi Yoshimura, Yokohama (JP); Kazuyuki Hino, Yokohama (JP); Jiro Higuchi, Yokohama (JP); Sachiyo Ito, Kawasaki (JP); Ken Furubayashi, Yokohama (JP)

(73) Assignee: Kioxia Corporation, Minato-ku (JP)

( * ) Notice: Subject to any disclaimer, the term of this patent is extended or adjusted under 35 U.S.C. 154(b) by 725 days.

(21) Appl. No.: 17/003,123

(22) Filed: Aug. 26, 2020

(65) Prior Publication Data

US 2021/0296166 A1    Sep. 23, 2021

(30) Foreign Application Priority Data

Mar. 23, 2020 (JP) .................. 2020-050725

(51) Int. Cl.
  *H01L 21/768* (2006.01)
  *G06F 30/398* (2020.01)
  *G06F 30/20* (2020.01)

(52) U.S. Cl.
  CPC ........ *H01L 21/76838* (2013.01); *G06F 30/20* (2020.01); *G06F 30/398* (2020.01)

(58) Field of Classification Search
  CPC ......... H01L 21/76838; H01L 21/76816; G06F 30/20; G06F 30/398; G06F 2119/14; G06F 30/23
  See application file for complete search history.

(56) References Cited

U.S. PATENT DOCUMENTS

| | | | | |
|---|---|---|---|---|
| 5,289,567 A  * | 2/1994 | Roth | ....................... | G06F 30/23 345/420 |
| 7,921,401 B2 | 4/2011 | Ito et al. | | |
| 9,922,161 B2 * | 3/2018 | Kahng | .................. | G06F 30/398 |
| 2007/0204243 A1 * | 8/2007 | Ito | ........................... | G06F 30/23 703/2 |
| 2008/0066023 A1 * | 3/2008 | Xu | ....................... | G06F 30/398 716/112 |
| 2010/0131244 A1 * | 5/2010 | Murakawa | ............... | G06F 30/23 703/2 |
| 2012/0299190 A1 * | 11/2012 | Reber | ............... | H01L 21/76816 257/774 |

(Continued)

FOREIGN PATENT DOCUMENTS

JP      2005-50137 A     2/2005
JP      2007-213269 A    8/2007

(Continued)

*Primary Examiner* — Stacy Whitmore
(74) *Attorney, Agent, or Firm* — Oblon, McClelland, Maier & Neustadt, L.L.P.

(57) ABSTRACT

In general, according to one embodiment, a stress analysis method comprising: dividing a surface of an object into a plurality of first rectangles each having a first size, on data; and acquiring a first type value for each of the first rectangles. The method further includes: specifying, from among the first rectangles, a plurality of second rectangles that have the first type value of a magnitude that falls within a first range and form a rectangle; and generating a stress model for a set of the second rectangles by using the second rectangles as an element.

11 Claims, 10 Drawing Sheets

(56) References Cited

U.S. PATENT DOCUMENTS

| | | | |
|---|---|---|---|
| 2016/0012174 A1* | 1/2016 | Shin | G06F 30/398 |
| | | | 716/112 |
| 2020/0117104 A1* | 4/2020 | Hino | G06F 30/30 |
| 2023/0127466 A1* | 4/2023 | Nakamura | H01J 37/20 |
| | | | 250/307 |

FOREIGN PATENT DOCUMENTS

| | | |
|---|---|---|
| JP | 2008-52380 A | 3/2008 |
| JP | 2020-60666 A | 4/2020 |

* cited by examiner

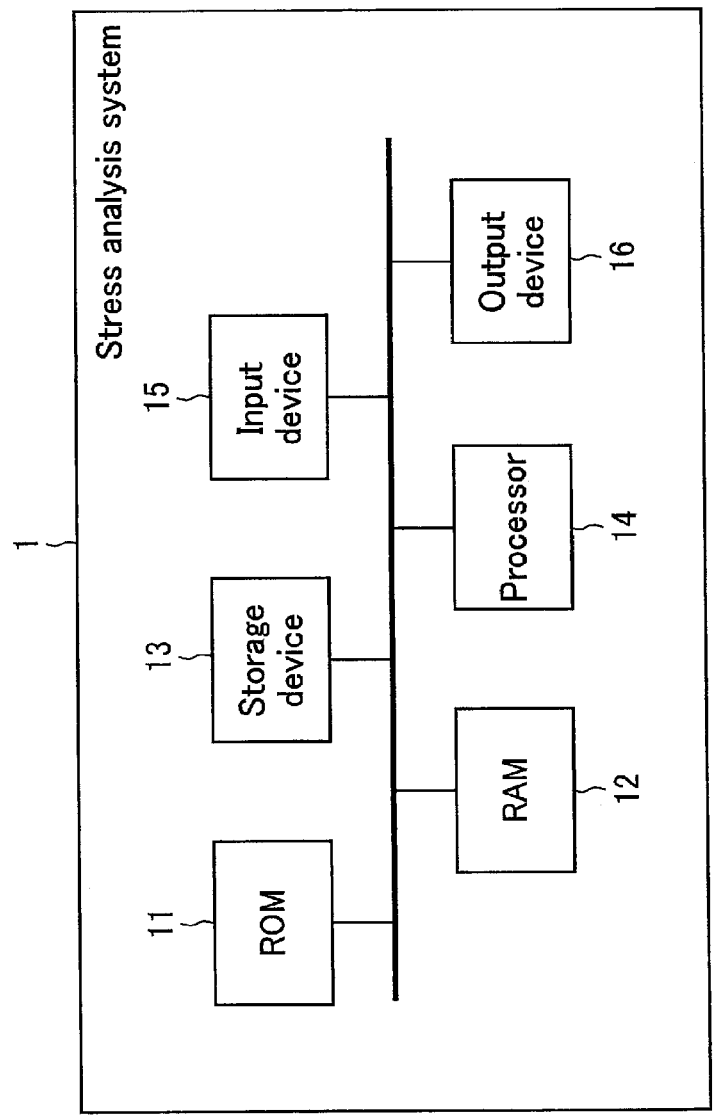
F I G. 1

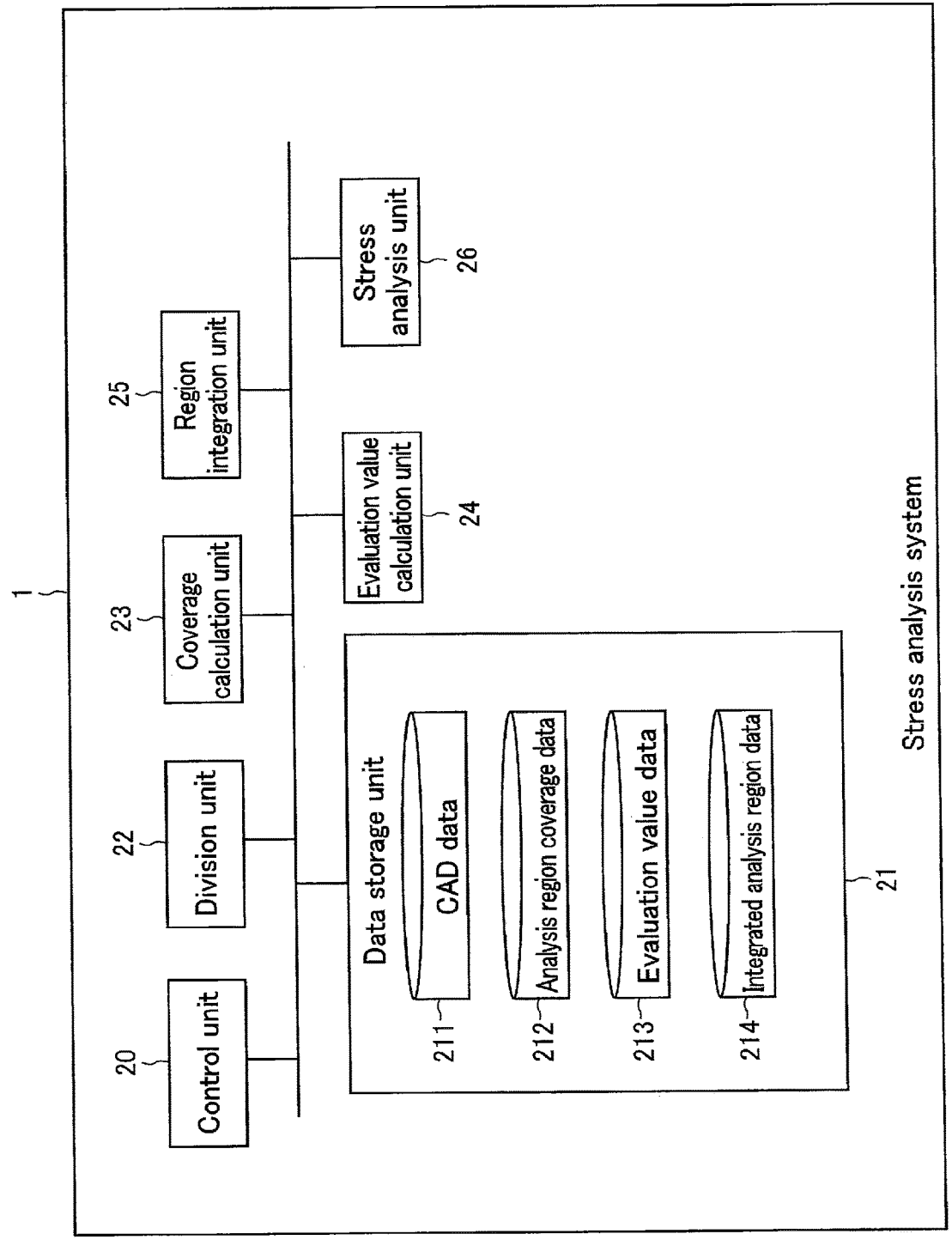
F I G. 2

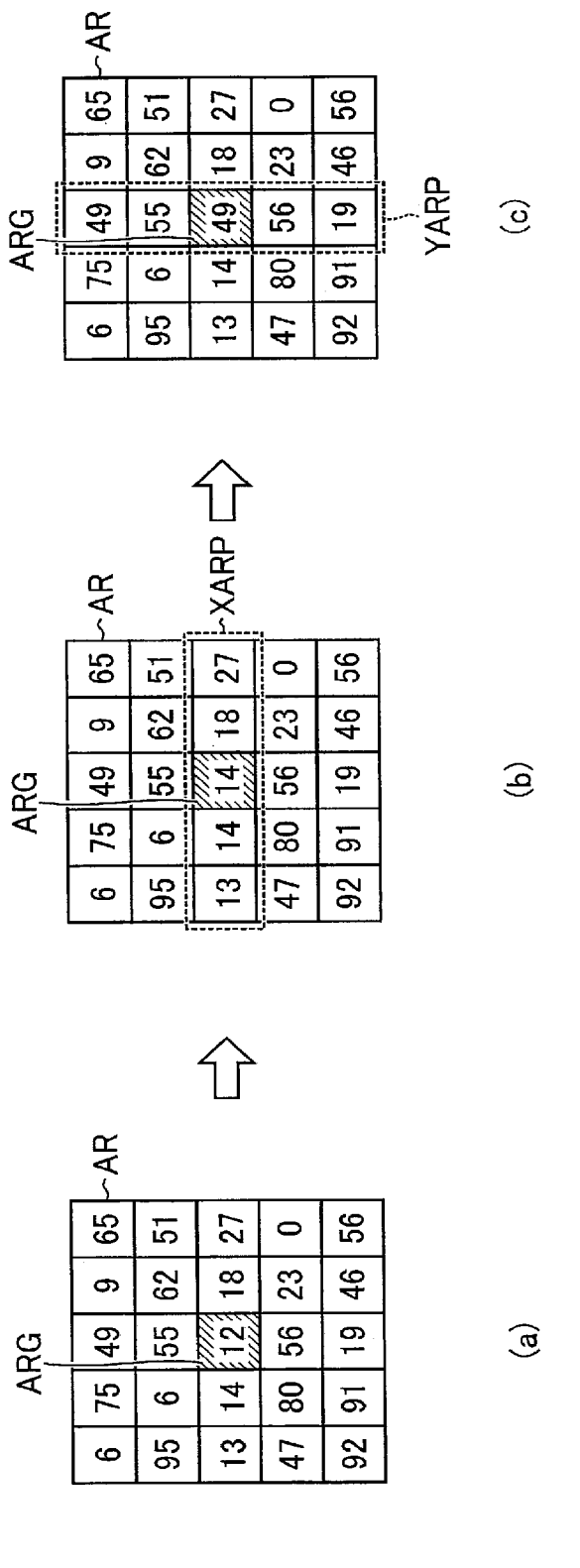
F I G. 5

| Range ID | Evaluation value range |
|---|---|
| 1 | $1 \leq$ Evaluation value $\leq VIC1$ |
| 2 | $VIC1 <$ Evaluation value $\leq VIC2$ |
| ⋮ | ⋮ |
| n | $VIC(n-1) <$ Evaluation value $\leq VICn$ |

FIG. 6

| Range ID | Reference value | Evaluation value range |
|---|---|---|
| 1 | R1 | $1 \leq \text{Evaluation value} \leq \frac{R1 + R2}{2}$ |
| 2 | R2 | $\frac{R1 + R2}{2} < \text{Evaluation value} \leq \frac{R2 + R3}{2}$ |
| ⋮ | ⋮ | ⋮ |
| n | Rn | $\frac{R(n-1) + Rn}{2} < \text{Evaluation value} \leq \text{ICRmax}$ |

F I G. 7

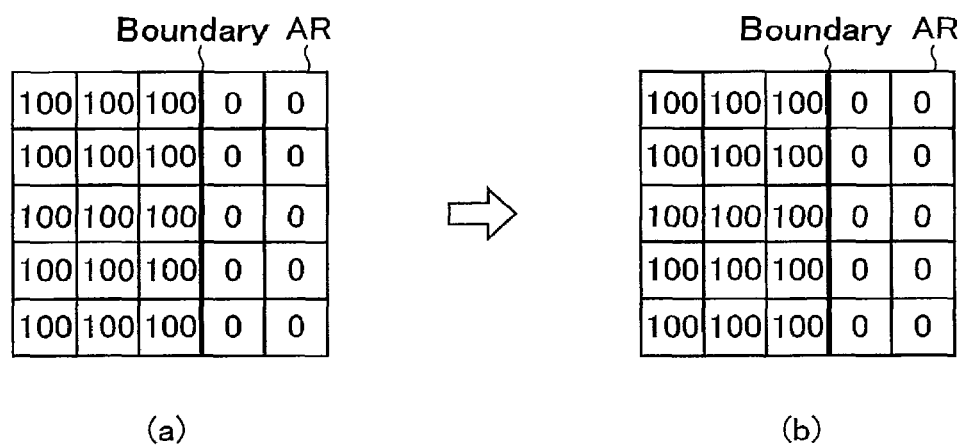
F I G. 9

STRESS ANALYSIS METHOD AND SEMICONDUCTOR DEVICE MANUFACTURING METHOD

CROSS-REFERENCE TO RELATED APPLICATIONS

This application is based upon and claims the benefit of priority from Japanese Patent Application No. 2020-50725, filed Mar. 23, 2020, the entire contents of which are incorporated herein by reference.

FIELD

Embodiments generally relate to a stress analysis method and a semiconductor device manufacturing method.

BACKGROUND

A semiconductor chip has different interconnect coverages depending on positions. A plurality of regions of different interconnect coverages generate different stresses. In addition, two adjacent regions of greatly different interconnect coverages generate large stresses. These stresses may separate the conductors and/or insulators in the semiconductor chip, or cause the conductors and/or insulators to chip and/or tear. In order to take measures against the stresses, stress analysis is performed at the time of designing the semiconductor chip.

BRIEF DESCRIPTION OF THE DRAWINGS

FIG. 1 shows an example of a hardware configuration of a stress analysis system according to the first embodiment.

FIG. 2 shows functional blocks of the stress analysis system of the first embodiment.

FIG. 5 shows an example of intermediate data obtained by the stress analysis system of the first embodiment.

FIG. 6 shows an example of conditions used for detecting analysis regions that are to be integrated in the first embodiment.

FIG. 7 shows an example of how a reference value and an evaluation value range are according to the first embodiment.

FIG. 9 shows how an analysis region, interconnect coverages and evaluation values are according to the first embodiment.

DETAILED DESCRIPTION

Figure 3:
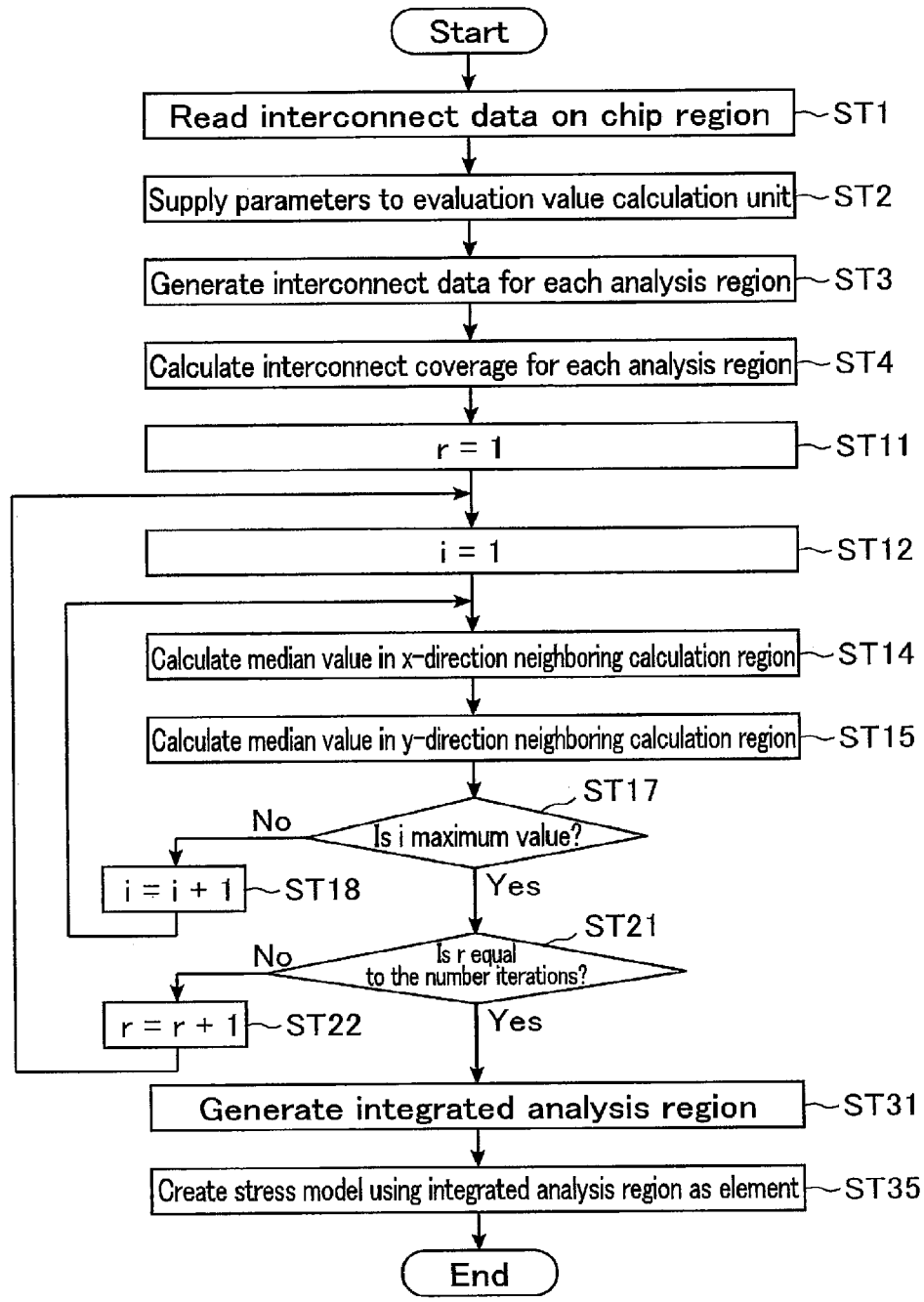
FIG. 3 shows a flow of stress analysis performed by the stress analysis system of the first embodiment.

In general, according to one embodiment, a stress analysis method comprising: dividing a surface of an object into a plurality of first rectangles each having a first size, on data; and acquiring a first type value for each of the first rectangles. The method further includes: specifying, from among the first rectangles, a plurality of second rectangles that have the first type value of a magnitude that falls within a first range and form a rectangle; and generating a stress model for a set of the second rectangles by using the second rectangles as an element.

Embodiments will now be described with reference to the Figures. In the following description, components with substantially the same functions and configurations will be referred to with the same reference numerals, and repeated descriptions may be omitted. In order to distinguish components having substantially the same function and configuration from each other, an additional numeral or letter may be added to the end of each reference numeral.

The entire description for a particular embodiment also applies to another embodiment unless explicitly mentioned otherwise or obviously eliminated.

Moreover, any step in a flow of a method of an embodiment is not limited to any illustrated order, and can occur in an order different from an illustrated order and/or can occur concurrently with another step.

1. First Embodiment 1.1. Configuration 1.1.1. Hardware Configuration

FIG. 1 shows an example of a hardware configuration of a stress analysis system according to the first embodiment. The stress analysis system 1 analyzes a stress in a semiconductor chip based on data. As shown in FIG. 1, the stress analysis system 1 includes a read only memory (ROM) 11, a random access memory (RAM) 12, a storage device 13, a processor 14 such as a central processing unit (CPU), an input device 15 and an output device 16. The ROM 11, the RAM 12, the storage device 13, the processor 14, the input device 15 and the output device 16 are communicably connected to each other via a bus.

The ROM 11 and the RAM 12 store various data electrically, magnetically, optically or mechanically. The ROM 11 stores a program (or computer software and/or firmware) that controls the operation of the stress analysis system 1. The RAM 12 temporarily stores various data.

The storage device 13 is an auxiliary storage device such as a hard disk drive (HDD) and/or a solid state drive (SSD). The storage device 13 can store a program for controlling the operation of the stress analysis system 1.

The processor 14 executes various operations of the stress analysis system 1 by executing a program loaded on the RAM 12 from the ROM 11 and/or the storage device 13. The program is configured to cause the stress analysis system 1, particularly the processor 14, to perform the operations described below.

The input device 15 includes one or more of a keyboard, a mouse and a touch panel. The output device 16 includes a display.

The stress analysis system 1 may include further devices, units and/or modules, such as a communication interface. The communication interface enables the stress analysis system 1 to communicate with an external device in a wired and/or wireless manner.

1.1.2. Functional Configuration

FIG. 2 shows functional blocks of the stress analysis system 1 of the first embodiment. Each functional block can be implemented as hardware, computer software, or combination of the both. For this reason, in order to clearly illustrate that each block can be any of hardware, software or combination thereof, descriptions will be made in terms of their functions in general. It is not necessary that functional blocks are distinguished as in the following examples. For example, some of the functions may be implemented by functional blocks different from those illustrated below. Furthermore, an illustrated functional block may be divided into functional sub-blocks.

For example, the functions of the functional blocks shown in FIG. 2 can be realized by the processor 14 that executes the program loaded on the RAM 12, as described above.

As shown in FIG. 2, the stress analysis system 1 includes a control unit 20, a data storage unit 21, a division unit 22, a coverage calculation unit 23, an evaluation value calculation unit 24, a region integration unit 25 and a stress analysis unit 26. The stress analysis system 1 analyzes a stress in a semiconductor chip based on data, by performing data processing using the data storage unit 21, the division unit 22, the coverage calculation unit 23, the evaluation value calculation unit 24, the region integration unit 2 and the stress analysis unit 26.

The control unit 20 controls the entire stress analysis performed by the stress analysis system 1.

The data storage unit 21 can be realized as part of the RAM 12. The division unit 22, the coverage calculation unit 23, the evaluation value calculation unit 24, the region integration unit 25 and the stress analysis unit 26 can be realized by operations performed by the processor 14.

The data storage unit 21 stores various data during the stress analysis performed by the stress analysis system 1. The data includes computer aided design (CAD) data 211 representing the design of a semiconductor chip, data processed by the stress analysis system 1, and intermediate data generated in the processing performed by the stress analysis system 1. The intermediate data includes analysis region coverage data 212, evaluation value data 213 and integrated analysis region data 214. The analysis region coverage data 212, the evaluation value data 213 and the integrated analysis region data 214 will be described in detail later.

The division unit 22 divides the entire region (hereinafter referred to as a chip region CR) in a plane (xy plane) formed by an x-axis and a y-axis of the semiconductor chip to be analyzed into a plurality of regions, on data. In the description below, the plurality of regions obtained by the division will be referred to as analysis regions AR. Examples of the division include division into meshes. Specifically, the division unit 22 uses the CAD data to divide the chip region CR to be analyzed on data into mesh-shaped analysis regions AR and generates data indicating the analysis regions AR. The analysis region AR has a size of 50 μm×50 μm, for example. The chip region CR is divided into a number of analysis regions AR based on the size of the analysis regions AR.

The coverage calculation unit 23 calculates a interconnect coverage for each analysis region AR on data. The interconnect coverage refers to a ratio of the area of the interconnect in the analysis region AR to the area of the entire analysis region AR. The interconnect coverage is expressed as a percentage, for example. Calculation of the interconnect coverage is not necessarily based on the exact area of the interconnects. The calculation can be performed using a known model so that a required stress analysis result can be obtained.

The evaluation value calculation unit 24 calculates a certain evaluation value from the interconnect coverage on data according to a certain calculation method. The method of calculating the evaluation value will be described in detail later.

The region integration unit 25 integrates a plurality of analysis regions AR on data based on the evaluation value. The set of analysis regions AR in the integrated state will be hereinafter referred to as an integrated analysis region IAR. Details of the integration will be described later.

The stress analysis unit 26 creates a finite element method three-dimensional model having the integrated analysis regions IAR as an element on data, and creates a finite element method three-dimensional model (finite element model) for the entire semiconductor chip.

2.1. Operation

The stress analysis system 1 analyzes the stress in a semiconductor chip. The semiconductor chip includes, for example, a semiconductor substrate spreading in the xy plane and a plurality of interconnect layers located at different levels along the z axis above the substrate.

FIG. 3 shows a flow of stress analysis performed by the stress analysis system 1 of the first embodiment. Some steps included in the flow will be described in detail later. The processor 14 operates as the control unit 20, dividing unit 22, coverage calculating unit 23, evaluation value calculating unit 24, region integrating unit 25 and stress analyzing unit 26 according to the program, and executes the processing described below.

As shown in FIG. 3, the control unit 20 loads, on the RAM 12, data on a interconnect pattern (interconnect data) which is included in the CAD data indicating the design of a semiconductor chip to be analyzed (step ST1). The interconnect data covers the entire semiconductor chip, that is, the chip region CR. The CAD data can be stored in the storage device 13 before the start of the flow, for example.

In step ST2, the control unit 20 supplies parameters to the evaluation value calculation unit 24. The parameters include one or more of an x-direction calculation range of an evaluation value, a y-direction calculation range of the evaluation value, the number of iterations and a reference value. These parameters will be described in detail later. The parameters may be values stored in advance in the storage device 13, or may be input by the user of the stress analysis system 1. For input by the user, the control unit 20 causes, for example, the output device 16 to display parameters requiring values, and prompts the user to input or select a value on the output device 16 for each parameter. The user inputs or selects a value of each parameter, using the input device 15.

In step ST3, the division unit 22 obtains interconnect data on each analysis region AR, using the interconnect data on the chip region CR. Specifically, the division unit 22 uses CAD data to divide the chip region CR into mesh-shaped regions in the xy plane. Each of the regions obtained by the division is an analysis region AR. Each analysis region AR can be specified by the coordinates of at least four vertices. Then, the division unit 22 obtains interconnect data on each analysis region AR. The smaller the analysis regions AR are, the more accurate the result of stress analysis can be. A set of interconnect data on analysis regions AR is analysis region interconnect data.

In step ST4, the coverage calculation unit 23 uses the analysis region interconnect data to calculate a interconnect coverage for each analysis region AR. The calculation of the interconnect coverage can be based on any known model. Each interconnect layer has a thickness in the z direction; however the interconnect coverage of each analysis region AR does not depend on the z-axis coordinates of the analysis region AR in each interconnect layer. The coverage calculation unit 23 uses a method that can obtain such a interconnect coverage. The interconnect coverage can be calculated in any known method. For example, the interconnect coverages of a plurality of layers in the analysis region AR whose interconnect coverage is to be calculated may be calculated, and the interconnect coverages of these layers may be combined by arithmetic operation. Alternatively, only the interconnect coverage of a representative layer may be used. By step ST4, data on the interconnect coverage for each analysis region AR is obtained. A set of interconnect coverage data on all analysis regions AR is analysis region coverage data 212.

In the subsequent steps, the evaluation value calculation unit 24 uses the analysis region coverage data 212 to calculate an evaluation value. Specifically, the evaluation value calculation unit 24 calculates evaluation values for all the analysis regions AR a plurality of times by executing steps ST11, ST12, ST14, ST15, ST17, ST18, ST21 and ST22. Any method can be adopted as a method for the calculation. In the description below, a description will be given of an example in which parameters i and r are used. When this method is used, a unique identification number (ID) is assigned to each analysis region AR. The ID is, for example, a natural number.

In step ST11, the evaluation value calculation unit 24 resets parameter r to 1. Next, in step ST12, the evaluation value calculation unit 24 resets parameter i to 1.

In subsequent steps ST14 and ST15, the evaluation value calculation unit 24 calculates an evaluation value for an analysis region AR having an ID equal to parameter i (which may be hereinafter referred to as a processing target analysis region ARG). The evaluation value for a certain processing target analysis region ARG is based on the interconnect coverage for that processing target analysis region ARG. The evaluation value is based on the arithmetic result obtained for the interconnect coverage of the processing target analysis region ARG and the interconnect coverage of each of analysis regions AR around the processing target analysis region ARG. Specifics of this will be described.

In step ST14, in order to calculate an evaluation value, the evaluation value calculation unit 24 uses a set of analysis regions AR that are within a range from the processing target analysis region ARG to a certain number on both sides along the x axis of the chip region CR (the range may be hereinafter referred to as an x-direction calculation region XARP). The range selected as the x-direction calculation region XARP from the processing target analysis region ARG is equal to the x-direction calculation range supplied as a parameter in step ST2. For example, when the x-direction calculation range is 2, the x-direction calculation region XARP includes two analysis regions AR on the left side of the processing target analysis region ARG (in the negative direction on the x axis) and two analysis regions AR on the right side the processing target analysis region ARG (in the positive direction on the x-axis).

The evaluation value calculation unit 24 calculates a median value of the interconnect coverages of all analysis regions AR (including the processing target analysis region ARG) of the x-direction calculation region XARP. The interconnect coverage for the processing target analysis region ARG is updated based on the calculated median value. In the processing subsequent to step ST14, the updated interconnect coverage is used as the interconnect coverage for the processing target analysis region ARG. The calculation performed in step ST14 will be described in detail later.

In step ST15, in order to calculate an evaluation value, the evaluation value calculation unit 24 uses a set of analysis regions AR that are within a range from the processing target analysis region ARG to a certain number on both sides along the y axis of the chip region CR (the range may be hereinafter referred to as an y-direction calculation region YARP). The range selected as the y-direction calculation region YARP from the processing target analysis region ARG is equal to the y-direction calculation range supplied as a parameter in step ST2. For example, when the y-direction calculation range is 2, the y-direction calculation region XARP includes two analysis regions AR on the lower side of the processing target analysis region ARG (in the negative direction on the y axis) and two analysis regions AR on the upper side of the processing target analysis region ARG (in the positive direction on the y-axis). The evaluation value calculation unit 24 calculates a median value of the interconnect coverages of all analysis regions AR (including the processing target analysis region ARG) of the y-direction calculation region YARP. The interconnect coverage for the processing target analysis region ARG is updated based on the calculated median value. In the processing subsequent to step ST15, the updated interconnect coverage is used as the interconnect coverage for the processing target analysis region ARG. The calculation performed in step ST15 will be described in detail later.

In step ST17, the evaluation value calculation unit 24 determines whether the calculation of new interconnect coverages performed in steps ST14 and ST15 has been completed for all the analysis regions AR. In the present example, this determination is the same as the determination made whether parameter i is equal to the largest ID of the analysis region AR.

Where there is an analysis region AR that is not treated as a calculation target, that is, where parameter i is not the maximum value (No in ST17), the process proceeds to step ST18. In step ST18, the evaluation value calculation unit 24 increments parameter i by 1. The process moves from Step ST18 to step ST14.

Where the calculation for all analysis regions AR is completed, that is, where parameter i is the maximum value (Yes of ST17), the process proceeds to step ST21. In step ST21, the evaluation value calculation unit 24 determines whether the calculation for all the analysis regions AR has been performed a predetermined number of times. In the present example, this determination is the same as the determination that is made whether parameter r is equal to the number of iterations supplied in step ST2. The number of iterations can be set to 3, for example.

Where the calculation for all sets of analysis regions AR is not iterated a predetermined number of times, that is, where parameter r is not equal to the number of iterations (No in ST21), the process proceeds to step ST22. In step ST22, the evaluation value calculation unit 24 increments parameter r by 1. Then the process moves from step ST22 to step ST12.

Where the calculation for all sets of analysis regions AR is iterated a predetermined number of times, that is, where parameter r is equal to the number of iterations (Yes in ST21), the process proceeds to step ST31. At the points of time after the process proceeds to step ST31, the interconnect coverage updated by a value calculated based on a median value is obtained for each of all the analysis regions AR. The updated interconnect coverage for each analysis region AR functions as an evaluation value of that analysis region AR. At the points of time after Yes in step ST21, an evaluation value for each analysis region AR is obtained. A set of data representing the evaluation values is the evaluation value data 213.

In step ST31, the region integration unit 25 uses the evaluation values of all analysis regions AR to detect a set of analysis regions AR that are adjacent to each other and that have evaluation values falling within one of a plurality of ranges. That is, a plurality of ranges of evaluation values are predetermined, and a set of a plurality of adjacent analysis regions AR that have evaluation values within one of the ranges is detected (specified). Such a set of adjacent analysis regions AR having evaluation values falling within one range is an integrated analysis region IAR. The detection (formation) of an integrated analysis region IAR is performed for the entire chip region CR, so that the chip region CR is divided into a plurality of integrated analysis regions IAR. A set of data representing each of all integrated analysis regions IAR is integrated analysis region data 214.

Integrated analysis region IAR is rectangular. That is, the region integration unit 25 selects the analysis regions AR forming the integrated analysis region IAR such that only rectangular integrated analysis region IAR is formed. The integration of the analysis regions AR performed in step ST31 will be described in detail later.

In step ST35, the stress analysis unit 26 uses the integrated analysis regions IAR as an element to create a finite element model of stress for the entire chip region CR.

2.1.1. Details of Division of Chip Region

Figure 4:
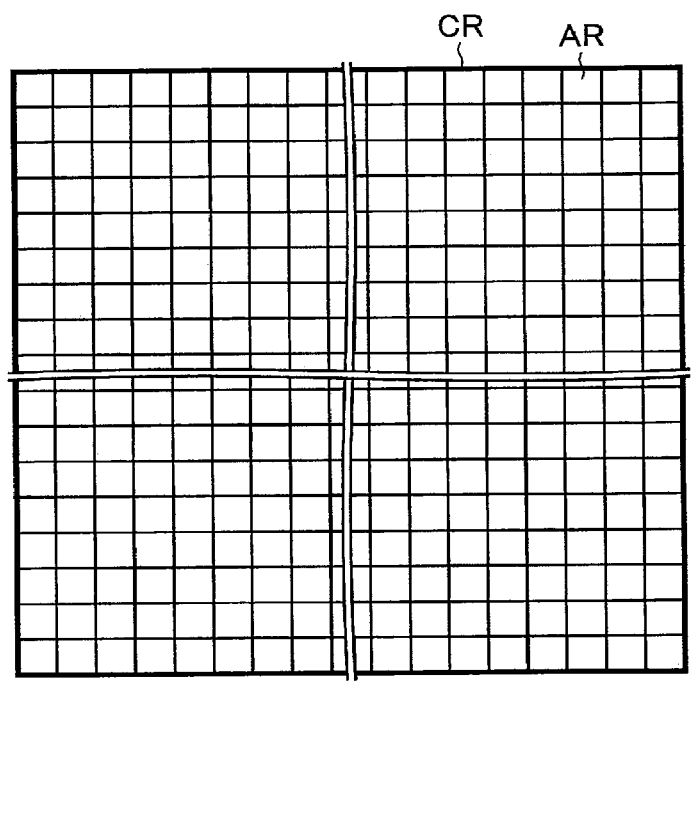
FIG. 4 shows an example of how a chip region and an analysis region are according to the first embodiment.

With reference to FIG. 4, a description will be given as to how the chip region of the first embodiment is divided, that is, an example of part of the details of step ST3 will be described. FIG. 4 shows an example of how a chip region and an analysis region are according to the first embodiment.

As shown in FIG. 4, the chip region CR is a rectangle spreading in the xy plane and having sides extending along the x axis and the y axis. The chip region CR is divided into analysis regions AR; in other words, the chip region CR is composed of a set of analysis regions AR. Each of the analysis regions AR is also a rectangle having sides extending along the x-axis and the y-axis. For example, the chip region CR and the analysis regions AR can be squares.

2.1.2. Details of Calculation of Median Value of Interconnect Coverages

With reference to FIG. 5, a description will be given of how a median value of interconnect coverages is calculated in the first embodiment, that is, an example of the details of steps ST14 and ST15 will be described.

FIG. 5 shows an example of intermediate data obtained by the stress analysis system of the first embodiment. Specifically, FIG. 5 shows how the interconnect coverages of a plurality of analysis regions AR change in steps ST14 and ST15 when parameters i and r are certain specific values. FIG. 5 shows a certain processing target analysis region ARG and its surrounding analysis regions AR. Specifically, FIG. 5 shows a total of 25 analysis regions AR, of which five analysis regions are arranged in one column and five analysis regions are arranged in one row. The processing target analysis region ARG is located at the center of the 25 analysis regions AR.

Portion (a) of FIG. 5 shows interconnect coverages in percentage terms at the start of step ST14. As shown in portion (a), the analysis regions AR have random interconnect coverages.

Portion (b) of FIG. 5 shows the interconnect coverages at the time of completion of step ST14. FIG. 5 shows an example in which an x-direction calculation region XARP includes two analysis regions AR on each of the right and left sides the processing target analysis region ARG. Based on such an x-direction calculation region XARP, the median value of the interconnect coverages of the processing target analysis region ARG and analysis regions AR included in the x-direction calculation region XARP is 14. Therefore, the interconnect coverage of the processing target analysis region ARG is updated to 14. As described above, in the subsequent processing, the latest value "14" is used as the interconnect coverage of the processing target analysis region ARG. Where the processing target analysis region ARG is located in the vicinity of the edge of the chip region CR and two analysis regions AR on the right or left side of that processing target analysis region ARG are unavailable, only the analysis regions within the available range are used to calculate the median value.

Portion (c) of FIG. 5 shows the interconnect coverages at the time of completion of step ST15. FIG. 5 shows an example in which a y-direction calculation region XARP includes two analysis regions AR on each of the upper and lower sides the processing target analysis region ARG. In the calculation performed in step ST15, the interconnect coverage of the processing target analysis region ARG updated in step ST14 is used. Based on such a y-direction calculation region YARP, the median value of the interconnect coverages of the processing target analysis region ARG and analysis regions AR included in the y-direction calculation region YARP is 49. Therefore, the interconnect coverage of the processing target analysis region ARG is updated to 49. Where the processing target analysis region ARG is located in the vicinity of the edge of the chip region CR and two analysis regions AR on the upper or lower side of that processing target analysis region ARG are unavailable, only the analysis regions within the available range are used to calculate the median value.

Steps ST15 and ST14 may be executed in this order.

Such a set of steps ST14 and ST15 is performed for each analysis region AR. As a result, the values of the processing target analysis regions ARG are sequentially updated. Where calculation is performed for another processing target analysis region ARG (for example, the analysis region AR on the right side of the processing target analysis region ARG shown in FIG. 5), the latest value 49 is used as the updated interconnect coverage of the processing target analysis region ARG.

2.1.3. Details of Integration of Analysis Regions

With reference to FIGS. 6 to 9, a description will be given as to how analysis regions are integrated, that is, an example of the details of step ST31 will be described. FIG. 6 shows an example of conditions used for detecting analysis regions that are to be integrated in the first embodiment. As shown in FIG. 6, a plurality of evaluation value ranges are defined, and the evaluation value ranges do not overlap each other. Values VIC1, VIC2, . . . VICn are specific evaluation values. Each evaluation value belongs to one of the evaluation value ranges. An evaluation value range is determined at the time of starting the integration of analysis regions AR.

The evaluation value range can be based on a reference value. FIG. 7 illustrates such a case and shows an example of how a reference value and an evaluation value range are according to the first embodiment. As shown in FIG. 7, n (n is a natural number) reference values R (R1, R2, . . . Rn) are determined at the start of integration of analysis regions AR. The reference value R may be a fixed value, or may be a reference value that is requested and input in step ST2 of the flowchart shown in FIG. 3.

As shown in FIG. 7, one evaluation value range is defined, with each reference value R in a center. The evaluation value range may be the difference from the reference value, may be based on the deviation, or may be determined by other methods.

Figure 8:
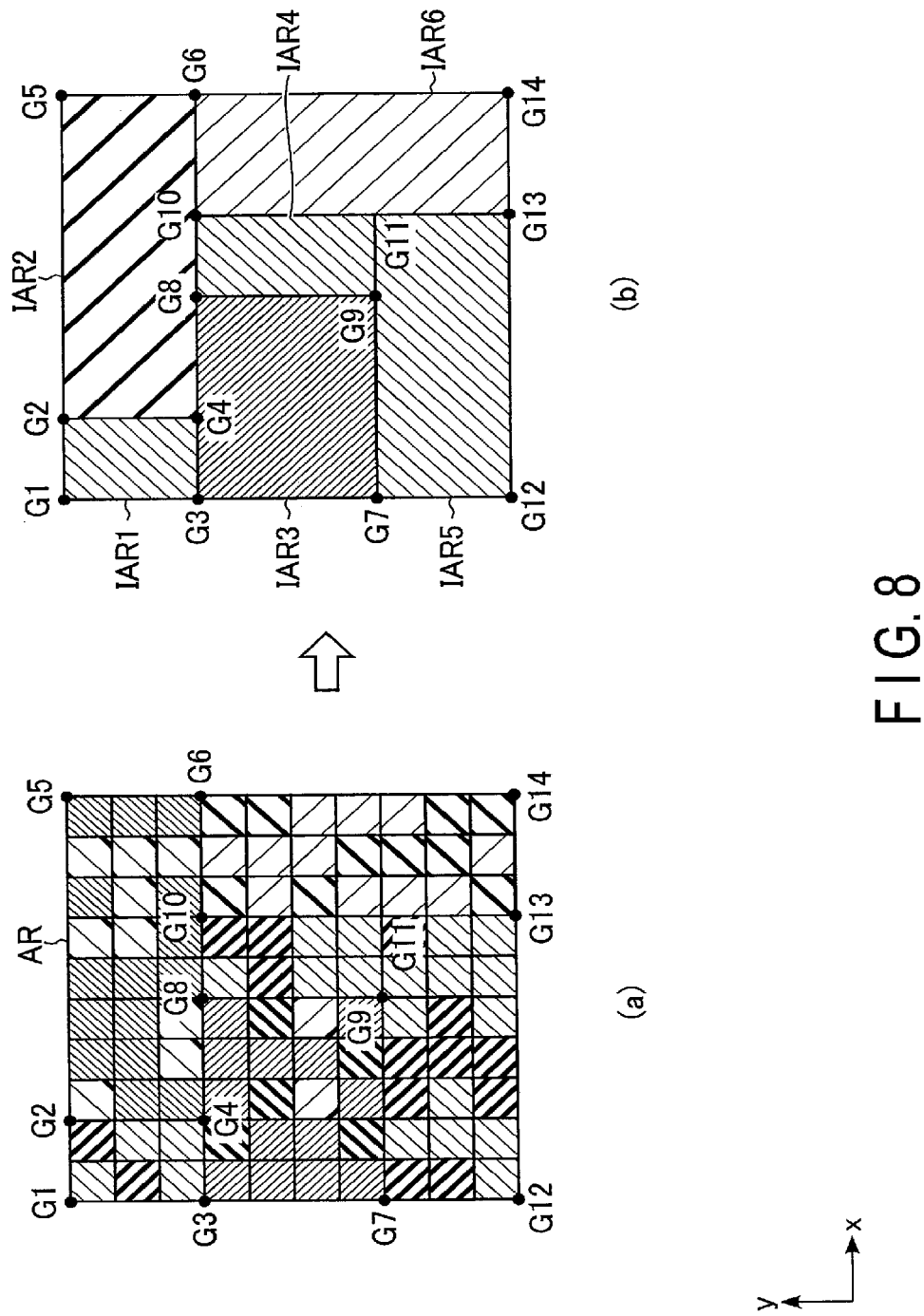
FIG. 8 shows an example of another intermediate data obtained by the stress analysis system of the first embodiment.

FIG. 8 shows an example of another intermediate data obtained by the stress analysis system of the first embodiment. Specifically, FIG. 8 shows an example of a plurality of adjacent analysis regions AR and their evaluation values, and shows an example of how these analysis regions AR are integrated.

In portion (a), FIG. 8 shows how the analysis regions AR and their evaluation values are at the time of starting the integration of the analysis regions AR. Each box in portion (a) shows one analysis region AR. Each analysis region AR can have any evaluation value based on the granularity based on the method of the interconnect coverage calculation performed in step ST4. For easy understanding, FIG. 8 does not show specific evaluation values but shows variations of evaluation values by different hatchings. The reference signs G1 to G14 indicate vertices of several analysis regions AR and are used in portion (b) as well.

In portion (b), FIG. 8 shows an example of the result of the integration of analysis regions AR shown portion (a), that is, an example of the integrated analysis regions IAR obtained as a result of step ST31. The analysis regions AR are integrated such that only rectangular integrated analysis regions IAR are obtained as described above. In the example shown in FIG. 8, integrated analysis regions IAR1 to IAR6 are obtained. In FIG. 8, the integrated analysis regions IAR of the same hatching belong to the same evaluation value range. In the example shown in FIG. 8, integrated analysis regions IAR1, IAR4 and IAR6 are all composed of analysis regions AR having evaluation values that fall within the same evaluation value ranges.

Each integrated analysis region TAR is defined by four vertices. That is, each integrated analysis region IAR is defined by the coordinates of at least four vertices and is composed of a set of analysis regions AR.

Integrated analysis region IAR1 is defined by the vector of the vertices (G1, G2, G3, G4). In the description below, the notation of vertex vector (α, β, γ, δ) indicates that α, β, γ, δ are the upper left, upper right, lower left and lower right vertices of integrated analysis region IAR, respectively.

Integrated analysis region IAR2 is defined by the vertex vector (G2, G5, G4, G6). Integrated analysis region IAR3 is defined by the vertex vector (G3, G8, G7, G9). Integrated analysis region IAR4 is defined by the vertex vector (G8, G10, G9, G11). Integrated analysis region IAR5 is defined by the vertex vector (G7, G11, G12, G13). Integrated analysis region IAR6 is defined by the vertex vector (G10, G6, G13, G14).

As described above, integrated analysis regions IAR1, IAR4 and IAR5 are all composed of analysis regions AR having evaluation values that fall within the same evaluation value range. However, the set of integrated analysis regions IAR1, IAR4, and IAR5 cannot form one rectangle. Therefore, independent integrated analysis regions IAR1, IAR4 and IAR5 are formed.

As should be clear from portions (a) and (b), the integrated analysis regions IAR1 to IAR6 are defined by vertices G1 to G14, and vertices G1 to G14 are also the vertices of analysis region AR before integration. Thus, each vertex of each integrated analysis region IAR is the same as one of the vertices of analysis regions AR. Therefore, the boundary between the integrated analysis regions IAR is also the same as the boundary between analysis regions AR.

3. Advantages (Advantageous Effects)

According to the first embodiment, a highly accurate stress analysis result (stress model) can be acquired in a short time, as described below.

In the stress analysis, a more accurate result can be obtained in accordance with a decrease in the size of an element that is used as a unit to be processed for generating a finite element model. In the case of the stress analysis of a semiconductor chip, the smaller an analysis region such as analysis region AR is, the more accurate the stress analysis result can be. This is because, where analysis regions are small, the boundary between the two regions whose interconnect coverages greatly differ is likely to be the same as the boundary between the analysis regions. On the other hand, the smaller the analysis regions are, the longer the time for stress analysis becomes. To shorten the analysis time, it is effective to use large-sized analysis regions. However, if large-sized analysis regions are used, the boundary between two regions having greatly different interconnect coverages may significantly deviate from the boundary between the analysis regions. This may lead to the generation of stress analysis results with low accuracy.

According to the first embodiment, a chip region CR is divided into small-sized analysis regions AR, the interconnect coverage of each analysis region AR is converted into an evaluation value by using the interconnect coverages of a plurality of surrounding analysis regions AR, and the plurality of analysis regions AR are integrated based on the evaluation value. A stress is analyzed using such integrated analysis regions IAR as an element. First, the small-sized analysis regions AR are used, so that the boundary between the analysis regions AR is likely to the same as the boundary between two regions having greatly different interconnect coverages and is therefore hard to deviate therefrom, as compared with the case where large-sized analysis regions AR are used. In addition, since the integrated analysis regions IAR maintain the same shapes as the original analysis regions AR in the integrated state, the boundary between the integrated analysis regions IAR is very likely to be the same as the boundary between two regions having greatly different interconnect coverages, and is therefore hard to largely deviate therefrom. Therefore, a stress analysis result with higher accuracy can be obtained than in the case where large-sized analysis regions AR are used.

Furthermore, the small-sized analysis regions AR are not used as they are as an element to analyze stress, but the integrated analysis region IAR is used as an element to analyze stress. Therefore, the number of elements used for the stress analysis is smaller than that required where the analysis regions AR are used as they are as an element for analysis. Thus, the stress analysis can be completed in a shorter time than the case where the analysis regions AR are used as they are as an element for analysis.

The evaluation value used as the criterion for integration is a median value of the interconnect coverage of the processing target analysis region ARG and the interconnect coverages of the plurality of analysis regions AR surrounding the processing target analysis region ARG. Therefore, the boundary between integrated analysis regions IAR accurately reflects the boundary between two regions having greatly different interconnect coverages. This will be described below.

FIG. 9 shows analysis regions AR within a certain range and the interconnect coverages thereof before integration according to the first embodiment, as well as evaluation values of the analysis regions AR within the range. As shown in portion (a), the analysis regions AR in the first, second and third columns from the left all have a interconnect coverage of 100%, and the analysis regions AR in the fourth and fifth columns from the left all have a interconnect coverage of 0%. That is, the interconnect coverage of the analysis regions AR in the first, second and third columns from the left and the interconnect coverage of the analysis regions AR in the fourth and fifth columns from the left are significantly different, and a boundary exists between the analysis regions AR in the third column from the left and the analysis regions AR in the fourth column from the left. It is desired that the boundary between the two regions having greatly different interconnect coverages should also be reflected in the boundary between integrated analysis regions IAR.

In portion (b), median values calculated from the interconnect coverages distributed as shown in portion (a) are shown as new interconnect coverages. As in the first embodiment, a median value of the interconnect coverage of the processing target analysis region ARG and the interconnect coverages of the vertically adjacent analysis regions AR is applied to the processing target analysis region ARG as a new interconnect coverage. Further, a median value of the interconnect coverage of the processing target analysis region. ARG and the interconnect coverages of the horizontally adjacent analysis regions AR is applied to the processing target analysis region ARG as a new interconnect coverage. In portion (b), interconnect coverages that use only the horizontally adjacent analysis regions AR are shown as an example. In portion (b), a new interconnect coverage is calculated by using three analysis regions, which are the processing target analysis region ARG, one analysis region AR adjacent to the processing target analysis region ARG on the left side, and one analysis region AR adjacent to the processing target analysis region ARG on the right side. When there are only two types of interconnect coverages from which a new interconnect coverage is to be calculated, two existing interconnect coverages are adopted as new interconnect coverages.

As shown in part (b), a boundary exists between the interconnect coverage of the analysis regions AR in the third column from the left and the interconnect coverage of the analysis regions AR in the fourth column from the left. This boundary is the same as the boundary between the interconnect coverages shown in portion (a). That is, the evaluation using the median value preserves the boundary based on the interconnect coverages. Therefore, the boundary between integrated analysis regions IAR also preserves the boundary between the interconnect coverages, and this leads to a more accurate stress analysis result.

4. Modifications and Application Examples

The description given so far relates to an example in which an intermediate value is used as an evaluation value. The example of the evaluation value is not limited to the intermediate value. For example, an average value, a differential value, etc. can be used. The average value is an average value of the interconnect coverages of all analysis regions AR in the x-direction calculation region XARP and/or the y-direction calculation region YARP.

Figure 10:
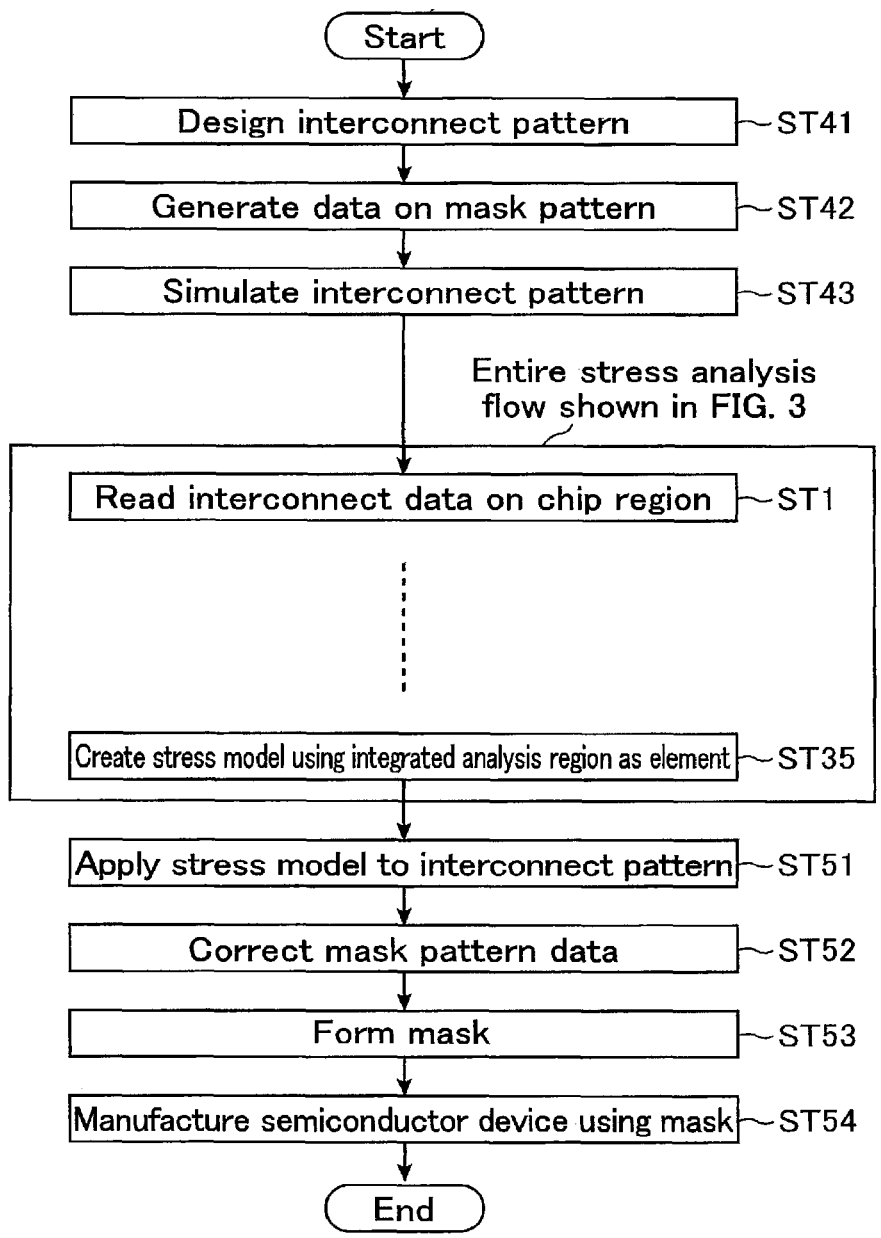
FIG. 10 shows a flow of an application example of the first embodiment.

The stress analysis performed by the stress analysis system 1 can be applied to the manufacture of semiconductor devices. FIG. 10 shows a flow of an application example of the first embodiment, and shows a flow of the method in which a semiconductor device of the first embodiment is manufactured.

As shown in FIG. 10, the process includes the entire flow of the stress analysis shown in FIG. 3, that is, all steps, and includes further steps. As shown in FIG. 10, a interconnect pattern of the semiconductor device is designed using CAD (step ST41). A mask pattern to be used in the lithography process for forming the designed interconnect pattern is formed on data (step ST42). The interconnect pattern formed by the mask pattern is predicted by simulation, and data on the predicted interconnect pattern is acquired (step ST43). Step ST43 proceeds to step ST1. In step ST1, the interconnect pattern data acquired in step ST43 is used as interconnect data.

Step ST35 proceeds to step ST51. In step ST51, a stress model is applied to the interconnect pattern obtained in step ST43 on data. Some interconnect patterns can be displaced by the application of stress. This displacement is taken into account, and the data on the interconnect pattern is updated such that the interconnect pattern designed in step ST41 can be obtained even if the displacement occurs. The data on the mask pattern formed in step ST42 is corrected based on the updated data of the interconnect pattern such that the updated interconnect pattern is obtained (step ST52). A mask is formed based on the corrected mask pattern data (step ST53). A semiconductor device is manufactured using the mask (step ST54).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stress analysis method comprising:
dividing, in chip design data, a surface of an object into a plurality of first rectangles each having a first size;
acquiring a first type value for each of the first rectangles;
specifying, from among the first rectangles, a plurality of second rectangles that have the first type value of a magnitude that falls within a first range and form a rectangle; and
generating a stress model for a set of the second rectangles by using the second rectangles as an element, wherein
the acquiring of the first type value for each of the first rectangles includes:
acquiring a second type value for each of the first rectangles; and
calculating a first median value of the second type value of a third rectangle included in the first rectangles and the second type values of a plurality of fourth rectangles that are included in the first rectangles and aligned with the third rectangle.

2. The method of claim 1, wherein:
the surface of the object includes a first axis and a second axis,
the fourth rectangles are aligned with the third rectangle along the first axis, and
the acquiring of the first type value for each of the first rectangles further includes: acquiring a second median value of the first median value and the second type values of a plurality of fifth rectangles that are included in the first rectangles and aligned with the third rectangle along the second axis; and using the second median value as the first type value of the third rectangle.

3. The method of claim 2, wherein:
the acquiring of the first type value for each of the first rectangles includes the using of the second median value of the third rectangle as the first type value of the third rectangle for each of the first rectangles while using another one of the first rectangles as the third rectangle.

4. The method of claim 3, wherein:
the third rectangle and the fourth rectangles are aligned, with the third rectangle located in a center, and
the third rectangle and the fifth rectangles are aligned, with the third rectangle located in a center.

5. The method of claim 4, wherein:
the object includes a plurality of interconnects, and
each of the second type values for the first rectangles is based on an interconnect coverage of a corresponding one of the first rectangles.

6. The method of claim 5, wherein:
the object is a semiconductor device.

7. The method of claim 3, wherein:
the object includes a plurality of interconnects, and
each of the second type values for the first rectangles is based on an interconnect coverage of a corresponding one of the first rectangles.

8. The method of claim 2, wherein:
the object includes a plurality of interconnects, and
each of the second type values for the first rectangles is based on an interconnect coverage of a corresponding one of the first rectangles.

9. A method of manufacturing a semiconductor device comprising:
generating a mask used for generating an interconnect pattern based on data of an interconnect pattern to which the stress model of claim 1 is applied; and
forming the interconnect pattern above a semiconductor substrate, using the mask.

10. A method of manufacturing a semiconductor device comprising:
generating a mask used for generating an interconnect pattern based on data of an interconnect pattern to which the stress model of claim 2 is applied; and
forming the interconnect pattern above a semiconductor substrate, using the mask.

11. A method of manufacturing a semiconductor device comprising:
generating a mask used for generating an interconnect pattern based on data of an interconnect pattern to which the stress model of claim 6 is applied; and
forming the interconnect pattern above a semiconductor substrate, using the mask.

* * * * *